3,036,018
REFRACTORY, DIELECTRIC, SEMI-CONDUCTING MATERIAL, AND METHOD OF PREPARING SAME

Lucien Péras, Billancourt, France, assignor to Regie Nationale des Usines Renault, Billancourt, France, a French works
No Drawing. Filed May 1, 1959, Ser. No. 810,217
Claims priority, application France May 5, 1958
4 Claims. (Cl. 252—520)

This invention relates to the method of preparation and to the constitution of a substance of ceramic character having specific electrical properties which may be either spread uniformly throughout the ceramic mass or on the contrary variable at will in said mass. The novel substances according to this invention are rigid, highly refractory and show, either thoughout their mass or at predetermined locations selected as a function of the specific use contemplated, a high permittance and semi-conductivity properties.

The novel substance forming the subject-matter of this invention is characterized in that it is free from any metal and consists of metal oxide compounds of which some are adapted to react with one another under high temperature conditions giving them the structure, hardness and inalterability of porcelains, that it contains notably titanium oxide in a proportion ranging from 5 to 80% by weight, which is incorporated in the mass either homogeneously or heterogeneously, or only locally, and that during its preparation by baking it is submitted to a reduction treatment applied at least locally by means of hydrogen.

According to a specific form of embodiment of this method of preparing ceramics for electrical use this substance is obtained by mixing in the raw state a clay adapted to harden when baked or a mixture of this clay with another oxide with 5% to 80% of titanium oxide $TiO_2$ from rutile or anatase. After thoroughly mixing these substances, the ceramic is shaped according to the known and conventional methods used in the ceramic industry, or sintered, and then baked at a temperature ranging from 1,200° C. to 1,500° C. during the time necessary (and varying as a function of the dimensions of the parts) for obtaining a faultless, homogeneous material free of any porosity. This baking step is accomplished in an oxidizing atmosphere and followed by a reduction treatment by means of hydrogen at a lower temperature (of the order of from 900° C. to 1,500° C.). This reduction may be carried out to a variable depth. The reduction which is denoted by the grayish or bluish-black colour of the mass, is inasmuch homogeneous as the mass is porous, that is to say, as the temperature at which the first baking step has been carried out is lower. Thus, by reducing the mass at 1,000° C. during one hour in hydrogen the reduction depth in a compact piece is .3 millimeter for a 15 percent $TiO_2$ content in the porcelain, if the first baking step has been carried out in an oxidizing atmosphere at 1,400° C.

It is also possible to perform only local reductions, if desired, and in this case the portions which are to be left in the oxidized conditions are protected from the hydrogen by adequate jigs or mountings.

In a typical preparation obtained according to this invention 20 kilograms of titanium oxide $TiO_2$ and 20 kilograms of pulverulent clay having the following composition:

| | Percent by weight |
|---|---|
| $Al_2O_3$ | 75 |
| $SiO_2$ | 25 | are thoroughly mixed.

The mass consists of a paste which is de-aerated, partially dried, shaped by extrusion, then partially dried again at room temperature and finally machined to suit the specific uses contemplated.

The resulting parts are baked in an oxidizing atmosphere at 1,400° C. during two hours, and cooled to 1,000° C., and then in the same oven hydrogen is substituted for the air and the heating is maintained during one hour, whereupon the parts are allowed to cool in the oven.

In certain cases the baking step in an oxidizing atmosphere and the reduction step are performed in separate ovens and the parts may be finished by grinding between the two steps. In this example, the thickness of the layer having undergone the reduction is .3 millimeter.

In a somewhat different form of embodiment comprising a first baking step at 1,200° C. followed by a second baking step at 1,400° C., flat plates 2 millimeters thick are obtained which are characterized by their compactness, heat-resisting properties and homogeneous properties throughout their mass.

According to a further form of preparation the titanium oxide $TiO_2$ is introduced into the inert ceramic mass by impregnation of a titanium salt such as titanium tetrachloride or of a solution of this compound, for example an alcohol solution of titanium tetrachloride. In this case the raw ceramic paste is subjected before its impregnation to a pre-baking step at a relatively low temperature of from 600° C. to 1,200° C., this temperature being preferably selected with precision as a function of the desired porosity. This preliminary baking step gives a porous mass having a consistency sufficient to permit its immersion without any risk in the titanium tetrachloride, the latter impregnating the pores, and then in water for hydrolyzing the tetrachloride. After drying, the ceramic is baked in the conditions consistent with the use contemplated, either directly in a reducing atmosphere or in an oxidizing atmosphere, this step being followed by a more or less extended reduction. The impregnation may be limited to one portion of the piece. Thus, in the case of a plate, the proper amount of titanium tetrachloride may be spread (after the preliminary baking step) at the points or along the specific areas or paths where a special electrical property is to be obtained, the other steps of the treatment being as per above.

In a typical example of this form of preparation an aluminous clay paste is prepared according to the composition suggested in the preceding example, and this paste is partially dried, then shaped by extrusion or rolling. Another partial drying step is performed at room temperature, the shaping step being subsequently completed by machining if necessary, and a preliminary baking step is carried out at 900° C. in an oxidizing atmosphere. The plate is impregnated with titanium tetrachloride at the points or along the lines where a high permittance and a semi-conductivity effect are desired, then the pieces are immersed in water. The plates thus obtained are dried very slowly, for example by simply exposing them to the atmosphere during twenty-four hours, this drying step being followed by a heating step at 100° C. Finally, the pieces are baked at 1,400° C. in an oxidizing atmosphere and at 900° C. in hydrogen.

In either methods of preparation if it is desired to obtain a considerable homogeneousness of the properties in the depth direction, the baking step in an oxidizing atmosphere is omitted and only the heating step in a hydrogen atmosphere is carried out with a first heating stage at 1,000° C. during one hour, followed by another stage at 1,400° C. during two hours.

On the one hand, a predetermined heterogeneousness may be obtained by varying the titanium oxide content, but in any case a prefectly insulating zone will not be obtained.

The practical applications of these new ceramics cover a wide range; thus, in the case of homogeneous ceramics, variable-leakage condensers may be obtained. By increasing the degree of reduction and the proportion of titanium oxide, the di-electric losses become more important and it is thus possible to obtain ceramics of which the equivalent circuit is a condenser bridged by a resistance.

In other reduction conditions a ceramic having a polarized conductivity may be obtained, that is, a ceramic providing a rectifying effect; under these conditions, condensers similar to the electrochemical condensers used in electronics can be obtained.

The heterogeneous ceramics obtained according to this invention are suitable for setting up capacitive connections providing a novel type of printed circuit adapted to be combined with conventional-type printed circuits.

As a matter of fact, in the case of heterogeneousness it is possible, according to the method set forth hereabove, to treat the refractory material only locally, that is, at predetermined locations disposed along a given path or circuit. Thus, for example, a pair of fixed plates may have arranged therebetween a movable insulating body wherein the spatial di-electric arrangement (in two or three dimensions) is adapted to provide a law of variation of an electrical magnitude (such as capacity, voltage, frequency or phase) as a function of the law governing the movement impressed to the movable insulating body. Of course, a similar result may be obtained by using a fixed insulating body and displacing the plates of the condenser thus obtained. There are many potential practical applications of this arrangement, for example in modulators, frequency modulators, telemetering, telecontrol, analogical calculus, computing machines, acceleration pickups, tachometers, di-electric amplifiers, etc.

The advantages resulting from electrical elements and devices made from the refractory material according to this invention may be summarized as follows: mechanical rigidity, high di-electric rigidity, reliability of connections due to their fixity, heat-resistance of the support and of the substance, and possibility of mass-producing the elements.

I claim:

1. The method for preparing ceramic bodies having semi-conductive properties which comprises forming a body of ceramic clay, baking said body at a temperature within the range of from 600° C. to 1200° C., impregnating at least a portion of the surface of said body with titanium tetrachloride, treating the impregnated portion with water to hydrolyze the titanium tetrachloride, drying the thus treated body and heating said body at a temperature of from 900° C. to 1500° C. in a reducing atmosphere.

2. The method according to claim 1, in which the treated body is heated in an oxidizing atmosphere at a temperature of from 1200° C. to 1500° C. before heating in a reducing atmosphere.

3. The method according to claim 1 in which the impregnation step is effected at predetermined points on said body.

4. The article produced by the process of claim 1.

References Cited in the file of this patent

UNITED STATES PATENTS

| | | |
|---|---|---|
| 1,642,754 | Singer | Sept. 27, 1927 |
| 2,286,881 | Bichowsky | June 16, 1942 |
| 2,369,266 | Thurnauer | Feb. 13, 1945 |
| 2,426,788 | Pall | Sept. 2, 1947 |
| 2,439,895 | Keats et al. | Apr. 20, 1948 |
| 2,520,376 | Roup et al. | Aug. 29, 1950 |
| 2,715,593 | Clark | Aug. 16, 1955 |
| 2,920,005 | Dearden | Jan. 5, 1960 |

OTHER REFERENCES

"Ceramics, a Symposium," pub. by British Ceramic Soc. (1953), Stoke-on-Trent, England (pages 266, 267, 269).